July 1, 1941.　　　　W. A. THUM　　　　2,247,675

BAKED BREAD LOAF HANDLING EQUIPMENT

Filed April 22, 1940　　　　4 Sheets-Sheet 1

INVENTOR
Walter A. Thum.
By
ATTORNEY

July 1, 1941.    W. A. THUM    2,247,675
BAKED BREAD LOAF HANDLING EQUIPMENT
Filed April 22, 1940    4 Sheets-Sheet 2

INVENTOR
Walter A. Thum.
By [signature]
ATTORNEY

July 1, 1941.  W. A. THUM  2,247,675
BAKED BREAD LOAF HANDLING EQUIPMENT
Filed April 22, 1940  4 Sheets-Sheet 4

INVENTOR
Walter A. Thum.
ATTORNEY

Patented July 1, 1941

2,247,675

UNITED STATES PATENT OFFICE 2,247,675

BAKED BREAD LOAF HANDLING EQUIPMENT

Walter A. Thum, St. Louis, Mo., assignor to Papendick, Inc., St. Louis, Mo., a corporation of Missouri Application April 22, 1940, Serial No. 330,965

18 Claims. (Cl. 198—33)

This invention relates generally to baked bread loaf handling equipment and, more particularly, to a certain new and useful improvement in mechanism specifically adapted for use in connection with the packaging of composite sliced bread loaves.

Since the advent of sliced bread, it has become quite general to combine a plurality of different kinds of bread into a single or composite loaf package, as it is called. Machinery has been developed for the rapid formation of such composite loaves, as exemplified in United States Patent No. 1,992,788, granted to Papendick, Inc., as assignee of Anthony B. Tewes, and the co-pending application, Serial No. 269,809, filed April 24, 1939, of Gustav C. Papendick, now deceased, and myself. However, with all such machinery, so far as I am aware, the various fractions of one particular kind of bread have different positions in successive loaves. For example, if a composite loaf is being formed which includes a half fraction of white bread and a half fraction of whole wheat bread, every first, third, and successive odd-numbered loaf will be delivered into the pockets of the wrapping machine intake conveyor with its white fraction, for instance, in forward position, and every second, fourth, and successive even-numbered loaf will be delivered into the pockets of the wrapping machine intake conveyor with its whole wheat half fraction in forward position.

For ordinary purposes, this reversal of positions from loaf to loaf is of no particular moment. Recently, however, it has become desirable to package such composite loaves in special wrapping paper so imprinted as to have one side descriptive of the white half fraction and the other side descriptive of the whole wheat half fraction. Since such wrapping paper is printed upon continuous rolls, and since it is relatively impossible to alternate or stagger the imprints upon the wrapper portion, it becomes necessary that the composite loaves be fed into the wrapping machine in a constantly uniform rather than alternated succession.

My invention hence has for its primary objects the provision of a loaf turning mechanism adapted for co-operation with composite loaf packaging machinery, which is unusually simple and economical in construction and operation, which will reverse or turn end for end each alternate loaf without slowing down or otherwise interfering with the normal flow of bread loaves to the wrapping machine intake conveyor, which may be readily applied to standard types of composite loaf packaging machinery for operation in timed relation therewith, which may, if desired, quickly and conveniently become inoperative, so as to eliminate any change in the normal flow of the sliced loaves, and which is highly efficient in the performance of its stated functions.

And with the above and other objects in view, my invention resides in the novel features of form, construction, arrangement, and combination of parts presently described and pointed out in the claims.

In the accompanying drawings (4 sheets):

Figure 1:
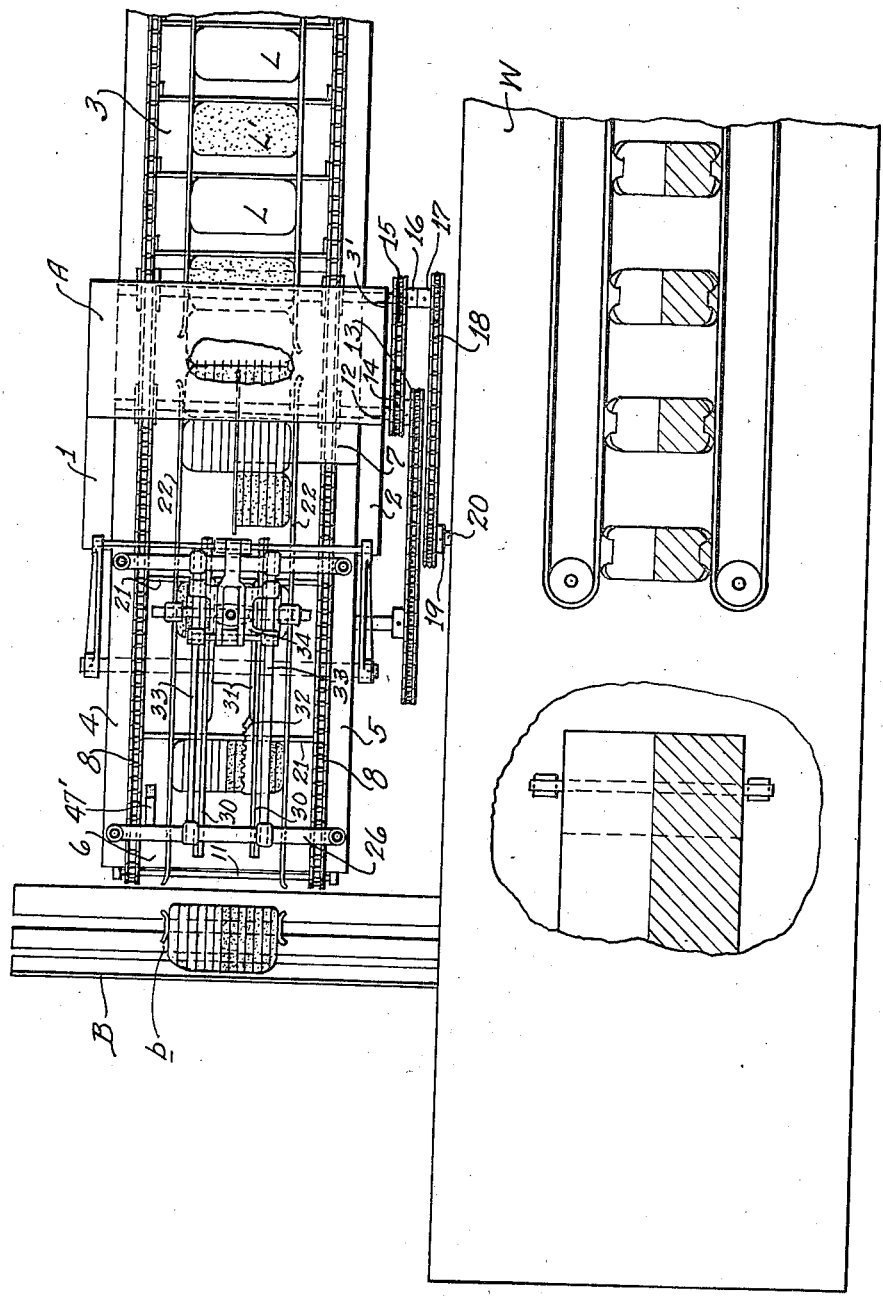
Figure 1 is a fragmentary, partly broken, plan view of a composite loaf packaging machine equipped with loaf turning mechanism of my present invention.

Referring now in more detail and by reference characters to the drawings, which illustrate a preferred embodiment of my invention, A is a bread loaf slicing machine preferably of the conventional vertically reciprocating knife-type having a pair of side frames 1, 2, fixed together in spaced parallel upstanding relation and a forwardly extending feed or intake conveyor 3 preferably of the conventional chain-driven flight rod type.

Mounted on, and extending horizontally rearwardly from, the side frames 1, 2, are spaced parallel side rails 4, 5, supported at their rear extremities by upstanding legs l.

Fixed along its longitudinal margins in, and extending horizontally between, the side rails 4, 5, is a flat-surfaced conveyor table 6 having its forward end disposed under a fractionating delivery plate 7 of the slicing machine A.

Disposed for travel over the upper face of the table 6 adjacent the side rails 4, 5, are spaced parallel chains 8 trained over rear and front pairs of sprockets 9, 10, respectively fixed upon an idle shaft 11 and a counter-shaft 12, the idle shaft 11 being journaled at its ends in the side frames 4, 5, and extending horizontally beneath the rear transverse margin of the table 6 and the counter-shaft 12 being similarly journaled and extending through the side frames 1, 2.

On one end, the counter-shaft 12 is provided with a pair of axially spaced sprockets 13, 14, the latter being connected by means of a sprocket chain 15 to an intermediate drive sprocket 16 fixed upon the extended end of the feed conveyor drive shaft 3', in turn provided with a sprocket 17 drivingly connected by means of a sprocket chain 18 to a drive sprocket 19 fixed upon an end of a main drive shaft 20 of a wrapping machine W.

Mounted at their ends in, and extending transversely of the machine between, the chains 8, is a plurality of preferably cylindrical flight rods 21 uniformly spaced one from the other by a distance substantially greater than the overall length of the largest bread loaf which is to be handled by the particular machine.

Also conventionally mounted upon the side rails 4, 5, for suitable adjustment, are opposed parallel loaf guides 22, all as best seen in Figure 1 and for purposes presently fully appearing.

Mounted upon, and upstanding from, the side rails 4, 5, are longitudinally spaced pairs of transversely aligned posts 23 provided at their upper ends with axially projecting threaded studs 24 for engagement in end-eyes 25 of cross heads 26 disposed transversely over the table 6 between the pairs of posts 23 and securely held upon the studs 24 by means of nuts 27.

Figure 2:
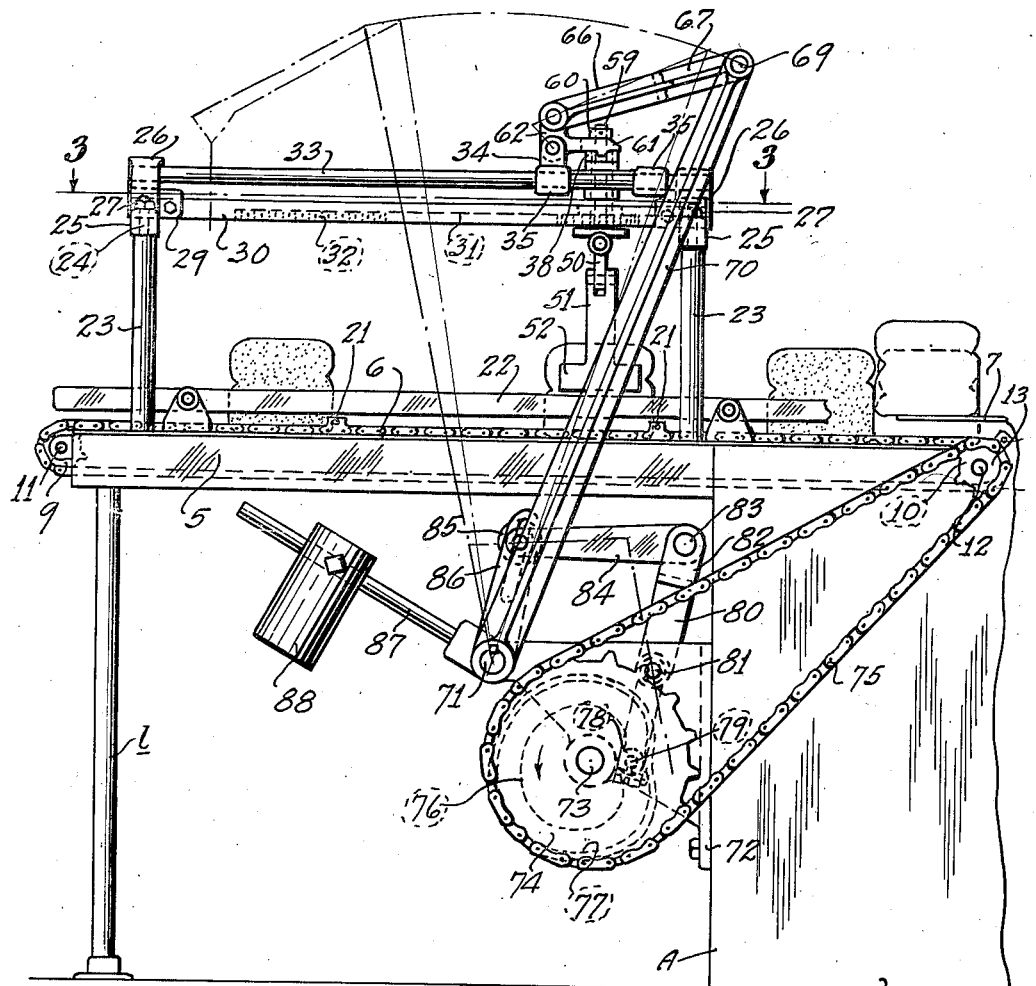
Figure 2 is an enlarged side elevational view of the loaf turning mechanism.
Figure 3:
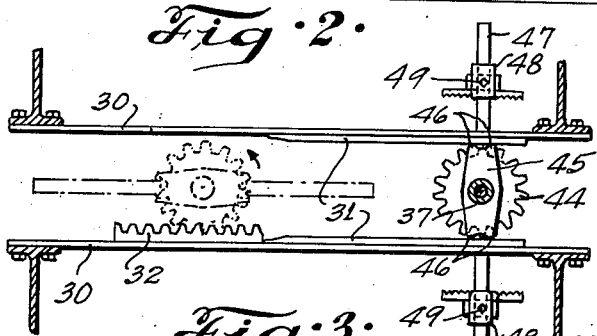
Figure 3 is a horizontal sectional view of the loaf turning mechanism, taken approximately along the line 3—3, Figure 2.

Centrally in its lower margin, each cross head 26 is cut away in the provision of a horizontally elongated U-shaped recess 28 having opposed vertically disposed side faces 29, and suitably fixed upon the faces 29, are parallel guide bars 30 provided along their upper margins for approximately the forward half of their length with slide-ways 31, one of the guide bars 30 being also provided with a rack section 32 positioned rearwardly of, and in a plane substantially below, the slide-way 31, all as best seen in Figures 2 and 3.

Fixed at their ends in, and extending horizontally between, the cross heads 26, are spaced parallel rods 33 preferably positioned slightly upwardly and outwardly from the guide bars 30 for slidably supporting a reciprocating carriage 34 provided with transversely aligned upstanding bosses 35 and having an intermediate web portion 36 bored for rotatably receiving a vertically disposed quill 37 provided at its upper end with a flange collar 38 having an upwardly presented diametral slot 39 and supported on its under face upon a conventional series of bearing washers 40.

At its lower end, the quill 37 projects downwardly midway between the slide bars 31 and substantially below the cross heads 26 and is rigidly provided at its lower extremity with an enlarged annular collar 41 diametrically reduced in its upper portion and provided with a double-toothed ratchet 42 for engagement with a spring-pressed pawl 43 operatively mounted upon the under face of a pinion 44, in turn, mounted for free rotation upon the quill 37 and positioned in the plane of the rack 32 for meshing engagement therewith.

Figure 5:
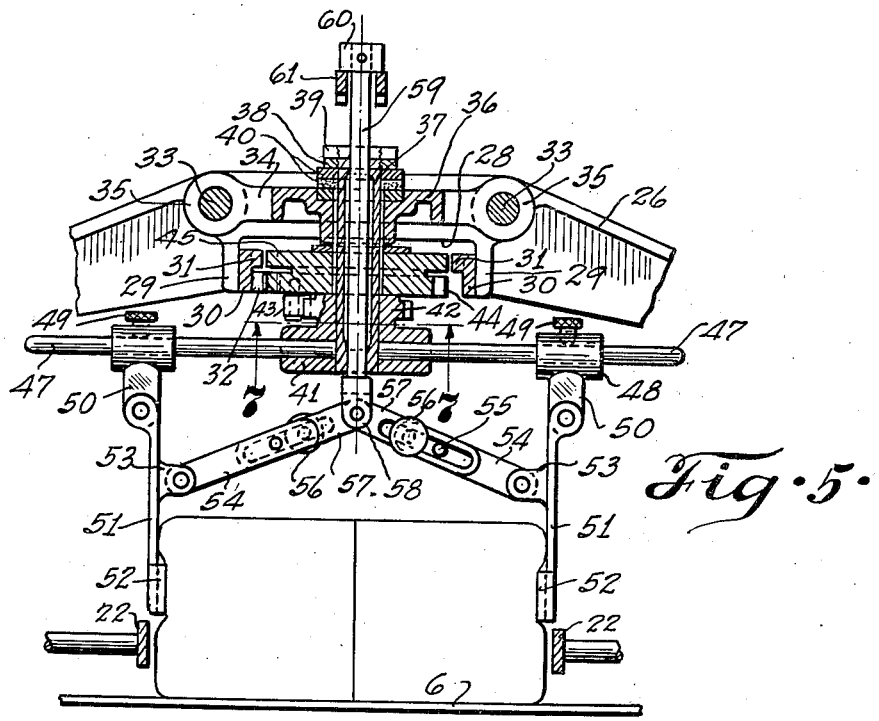
Figure 5 is a fragmentary vertical sectional view of the gripping device in loaf-gripped position, taken approximately along the line 5—5, Figure 2, and illustrating in more detail the operation of the loaf grippers of my present invention.
Figures 6, 7:
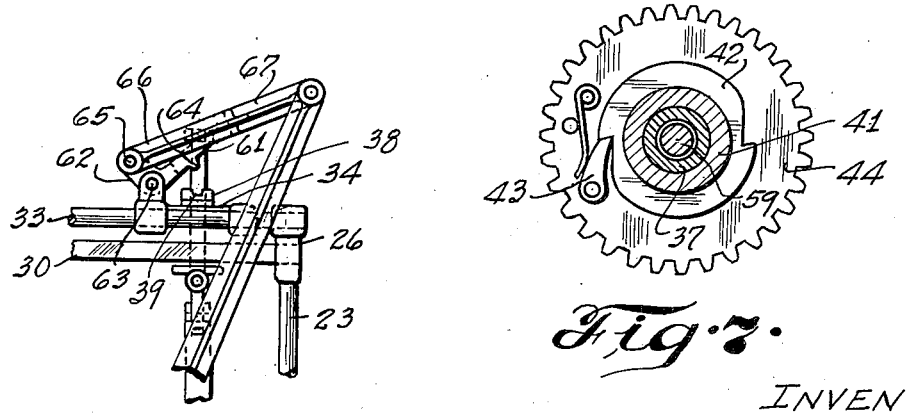
Figure 6 is a fragmentary side elevational view of the loaf turning mechanism, illustrating the driving yoke in disconnected position.
Figure 7 is a horizontal sectional view, taken approximately along the line 7—7, Figure 5, and illustrating in more detail the ratchet connected reversing gear of my present invention.

Formed preferably integrally upon the upper face of the pinion 44, is a diametrally extending lockpiece 45 having oppositely presented pairs of faces 46 for sliding engagement with the opposed faces of the flanges 31, all as best seen in Figures 3 and 5 and for purposes presently fully appearing.

Fixed in, and extending radially outwardly from, the collar 41, are axially aligned horizontally disposed rods 47 for slidably accommodating tubular sleeves 48, which are adjustably secured upon the rods 47 by means of set screws 49 and preferably integrally provided with downwardly projecting lugs 50 for pivotally supporting swingable arms 51 provided upon their lower extremities with gripper members or jaws 52 for engagement with the oppositely presented end faces of a bread loaf. Fixed upon and projecting from the forward cross head 26, is a bumper or stop abutment 47' for engagement with the outer end of one of the arms 47 to prevent over-travel beyond 180° when the loaf-gripping mechanism is rotated to turn the loaf end for end.

Intermediate their ends, the arms 51 are provided with inwardly presented knuckles 53 for pivotal engagement with link members 54, each, in turn, provided with threaded apertures 55 and thumb screws 56 disposed therein for adjustable sliding engagement in slotted links 57, which are, in turn, at their free ends pivotally mounted in a bifurcated end fitting 58 fixed upon the downwardly projecting extremity of an actuating bar 59 disposed for lengthwise slidable movement in the quill 37 and provided on its upwardly presented end with a set collar 60 for suspended engagement across the bifurcated end 61 of a bell-crank 62 rockably mounted upon a pintle 63 fixed at its ends in, and extending horizontally between, the carriage bosses 34.

At its bifurcated end 61, the bell-crank 62 is provided with a pair of downwardly presented protuberances 64 for locking engagement in the diametral slot 39 of the quill collar 38.

At its opposite end, the bell-crank 62 is pivotally mounted upon a pin 65 fixed at its ends in, and extending horizontally between, the arms 66 of a connecting yoke 67, in turn, rockably mounted, and by means of set-collars 68 held against transversely shifting movement, upon a horizontally extending cross-rod 69 fixed at its ends in the upper extremities of elongated rock arms 70 pinned at their lower extremities upon the outer ends of a rock shaft 71 journaled in and extending horizontally between suitably shaped bracket members 72 suitably fixed upon the rearwardly presented end face of the slicing machine A.

Also journaled in the brackets 72 and disposed in downwardly spaced parallel relation to the rock shaft 71, is a driven shaft 73 provided at its one extended end with a large sprocket 74 connected by means of a chain 75 to the sprocket 13 of the slicing machine countershaft 12.

Pinned upon the shaft 73 intermediate the brackets 72, is an internal cam wheel 76 having a somewhat heart-shaped groove 77 for accommodating a roller 78 rotatively mounted upon a pin 79 fixed in the end of a lever 80 fulcrumed for rocking movement upon a pin 81 fixed in the adjacent bracket 72.

Figure 4:
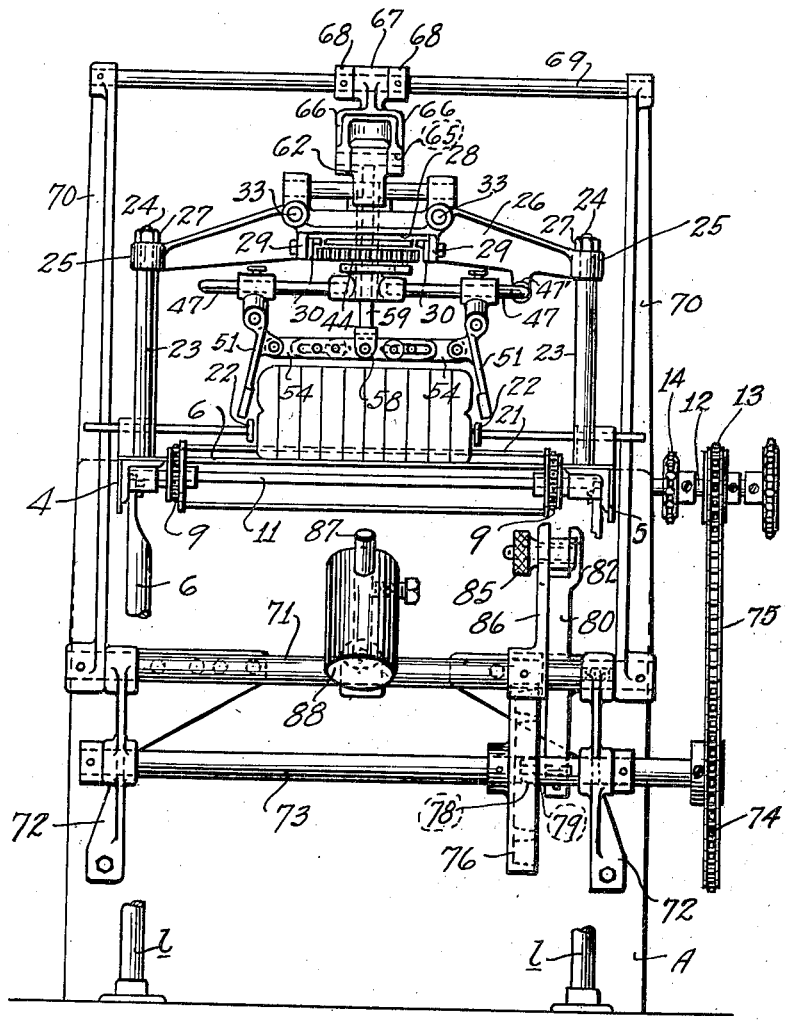
Figure 4 is a vertical end elevational view of the loaf turning mechanism.

At its upper end, the rocking lever 80 is bifurcated in the provision of a pair of spaced arms 82 for supporting a pintle 83, rockably mounted on which, is a rearwardly presented link 84 provided at its other end with a thumb screw 85 for adjustable engagement in a slotted arm 86, in turn, at its lower extremity pinned upon the rock shaft 71. For compensating for the weight of the rock arms 70 and the associated mechanism, the rock shaft 71 is preferably provided with a radially outwardly extending rod 87 for adjustably supporting a counterweight 88, all as best seen in Figures 2 and 4 and for purposes presently fully appearing.

The wrapping machine W may be of any conventional type and is provided with an intake conveyor B preferably of the chain driven intermittent movement type having a plurality of adjustable pockets b and positioned adjacent the rear or discharge end of the conveyor table 6, all as best seen in Figure 1.

In use and practice, the guides 22 are adjusted to accommodate the length of loaf which is to be handled by the particular machine. Similarly, the sleeves 48 and the links 54, 57, are suitably adjusted, so that the swingable arms 51 and the associated gripper members or jaws 52 are likewise suitably spaced for accommodating such particular load length.

If now, for example, it is desired to prepare a composite package consisting of one half fraction of white bread and another half fraction of whole wheat bread, then white bread loaves L and whole wheat bread loaves L' are placed in alternate consecutive alignment in the feed conveyor 3 and progressed through the slicing machine A. Issuing from the slicing machine A, the several sliced loaves are fractionated and separated for composite loaf alignment by the fractionating plate 7 and associated mechanism. It will, of course, be understood in this connection that any type of fractionating and composite-alignment mechanism may be employed. Thus, composite loaves consisting of a half fraction of whole wheat and a half fraction of white bread will be deposited upon the forward end of the conveyor table 6 in front of the flight bars 21 for rearward progression to the intake conveyor B of the wrapping machine W. As previously explained, such composite loaves will be in alternately reversed relationship.

Thus, the first delivered composite loaf will be progressed rearwardly to the intake conveyor B without interference. However, as the succeeding composite loaf, which is in inverted or reversed relationship, is progressed rearwardly, the cam 76 will have rotated into such a position that the rocking lever 80 will begin to swing in a counter-clockwise direction, shifting the link 84 forwardly and rocking the arm 86 and rock shaft 71 in a counter-clockwise direction. This rocking movement of the shaft 71 will initially swing the rock arms 70 forwardly, which motion, being transmitted through the yoke 67, will swing the bifurcated end 61 of the rock arm 62 upwardly against the set collar 60, thereby lifting the slide bar 59 and pulling the swinging arms 51 together into parallel relationship. This movement is obviously timed in relation to the rearward movement of the bread loaf, so that the grippers 52 will come into endwise gripping engagement with the bread loaf, as shown in Figure 5.

Without interruption, the rock arm 70 will continue its forward swinging movement and shift the carriage 34 forwardly along the supporting rods 33. In this connection, it should be pointed out that the cam groove 77 is so shaped with relation to the length and throw of the various connected links and arms that the carriage 34 will move forwardly at twice the speed of the flight rods 21. Thus, the gripped bread loaf will be accelerated and, by the time the carriage has reached the mid point of its rearward travel, the gripped loaf will be positioned approximately midway between the flight rod 21 by which it was originally being progressed and the next preceding flight rod 21. During this movement, the locking bar 45 will be disposed transversely between the slide flanges 31 and slidably engaged therewith at its end faces 46 so as to prevent unauthorized rotative movement of the gripper arms 51 and the engaged bread loaf. However, as the carriage 34 reaches approximately the mid point of its rearward travel, the locking bar 45 passes beyond the ends of the slide bars 31 and the pinion 44 enters into engagement with the rack 32. Continued forward movement of the carriage 34 causes the pinion 44 to rotate in a counter-clockwise direction, as shown by the arrow in Figure 3. When rotated in such direction, the pinion 44 is locked to the ratchet 42 by means of the pawl 43 and the quill 37 and associated collar 41, together with the arms 51 and grippers 52, are rotated about a vertical axis, thereby turning the engaged bread loaf through 180°, that is to say, end for end, so that the white half fraction will come into consecutive alignment with the white half fraction of the preceding bread loaf.

As the rock arms 70 and the carriage 34 reach the forward limit of travel, the cam 76 will have rotated through 180° and, upon continued rotation, reverse the movement of the rock arm 70, causing it to swing in a clockwise direction. The initial swinging movement of the rock arm 70 will cause the bell crank 62 to swing in a clockwise direction, dropping the bifurcated end 61 thereof and shifting the sliding bar 59 downwardly, thereby swinging the arms 51 and associated grippers 52 outwardly, releasing the bread loaf. At the same time, the downwardly projecting protuberances 64 will enter into engagement with the slots 39 of the quill collar 38, holding the quill against rotation. Continued reverse movement of the rock arms 70 will thereupon shift the carriage forwardly to its original position. Meanwhile, the pinion 44, moving forwardly over the rack section 32, will be reversely rotated, but such reverse rotatory movement will not be transmitted to the quill 37 by reason of the fact that the pawl 43 will not positively engage the ratchet 42 during such movement.

During the return movement of the carriage 34, the next succeeding composite bread loaf will pass freely and uninterruptedly between the reversely moving spaced grippers 52. By the time the carriage 34 reaches the forward limit of its travel, a succeeding composite loaf will have moved up into position between the grippers 52 for engagement thereby, and the above described operations will be repeated in the same sequence for turning such engaged bread loaf end for end.

Each of the alternate bread loaves, as they are released by the grippers 52, will come to rest momentarily upon the conveyor table 6 until the flight rod 21, which has continued its forward movement at uniform speed, has moved up into pushing engagement with the loaf and progresses such loaf rearwardly over the end of the conveyor table 6 into the waiting pocket b of the wrapping machine W.

Thus, it will be seen that the alternate loaves will be turned end for end, so that each loaf as it is delivered into the pockets b of the wrapping machine intake conveyor B will be uniformly positioned in order that the white and whole wheat half fractions will always occupy the same relative positions in each successive loaf.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. Bread loaf handling mechanism comprising a conveyor for progressing a bread loaf, in combination with means including co-operable arms having faces disposed at right angles to the longitudinal axis of the loaf for gripping said loaf and turning the same end for end.

2. Bread loaf handling mechanism comprising a conveyor, auxiliary means having co-operable arms for gripping a conveyed loaf, and driving means actuable in timed relation with travel of the conveyor for initially accelerating and subsequently rotating the arms for turning the gripped loaf end for end.

3. Bread loaf handling mechanism including a table, a connected series of flight rods mounted for movement over the table, a carriage shiftable over the table and in predetermined timed relation to the movement of the flight rods, and means mounted in the carriage for gripping selected conveyed loaves and turning the same end for end.

4. Bread loaf handling mechanism including a table, a connected series of flight rods mounted for travel over the table, a pair of longitudinally extending spaced parallel slide rods mounted on and spaced over the table, a carriage mounted for movement on the rods, means for shifting the carriage to and fro along said rods in predetermined timed relation to the movement of the flight rods, and means on the carriage for gripping selected conveyed loaves and turning the same end for end.

5. Bread loaf handling mechanism including a table, a connected series of flight rods mounted for travel over the table, a frame mounted on and disposed over the table, a pair of longitudinally extending spaced parallel slide rods on the frame, a carriage mounted for movement on the rods, means for shifting the carriage to and fro along said rods in predetermined timed relation to movement of the flight rods, means on the carriage for gripping selected bread loaves, and means mounted on the frame for engagement with the loaf gripping means upon forward shifting movement of the carriage for turning the loaf gripping means through an angle of 180° for turning the gripped loaf end for end.

6. Bread loaf handling mechanism including a table, a plurality of chain-driven flight rods mounted for travel over the table in a spaced parallel series, a frame mounted on and disposed over the table, a pair of longitudinally extending spaced parallel slide rods mounted on the frame, a carriage mounted for movement on the rods, loaf gripping means rotatably mounted in the carriage, driving means for initially actuating the loaf gripping means to engage a selected bread loaf and thereupon shift the carriage, associated loaf gripper, and engaged loaf forwardly at an accelerated rate of speed, and means mounted on the frame engageable with the loaf gripping means upon forward shifting movement for rotating the loaf gripping means through an angle of 180° for turning the selected loaf end for end.

7. A bread loaf handling mechanism including conveyor means for progressing sliced loaves forwardly along a predetermined path, loaf-rearranging means for forming the sliced loaves into composite loaves, and means disposed forwardly of the rearranging means for turning every alternate composite loaf end for end.

8. Bread loaf handling mechanism including a conveyor for progressing bread loaves along a predetermined path at spaced intervals, and means supported above the path for gripping the progressed bread loaves, said means including a frame, a pair of longitudinally extending spaced parallel slide rods mounted on the frame, a carriage shiftably mounted on the rods, means for reciprocating the carriage, a rotatable quill suspended from the carriage, track means mounted on the frame, means fixed upon the quill and slidably engageable with the track means for a predetermined distance for locking the quill against rotation during a predetermined portion of the movement of the carriage, and means for rotating the quill through an arc of 180° as the carriage moves through a successive portion of its path of travel.

9. Bread loaf handling mechanism including a conveyor for progressing bread loaves along a predetermined path, and means supported above the path for gripping the progressed bread loaves, said means including a frame, a pair of longitudinally extending spaced parallel slide rods mounted on the frame, a carriage shiftably mounted on the rods, means for reciprocating the carriage, a rotatable quill suspended from the carriage, track means mounted on the frame, means fixed upon the quill and slidably engageable with the track means for a predetermined distance for locking the quill against rotation during a predetermined portion of the movement of the carriage, a gear mounted on the quill, and rack means mounted on the track for quill rotative engagement with the gear along a successive portion of the path of movement of the carriage.

10. Bread loaf handling mechanism including a conveyor for progressing bread loaves along a predetermined path, and means supported above the path for gripping the progressed bread loaves, said means including a frame, a pair of longitudinally extending spaced parallel slide rods mounted on the frame, a carriage shiftably mounted on the rods, a rotatable quill suspended from the carriage, track means mounted on the frame, means fixed upon the quill and slidably engageable with the track means for a predetermined distance for locking the quill against rotation during a predetermined portion of the movement of the carriage, a gear rotatably mounted on the quill, means for connecting the gear to the quill for unidirectional movement with respect thereto, and rack means mounted on the track for quill rotative engagement with the gear along a successive portion of the path of movement of the carriage.

11. Bread loaf handling mechanism including a conveyor table, a plurality of chain-driven flight rods mounted for movement across the table in a spaced parallel series, a frame mounted on and extending above the table, a pair of longitudinally extending spaced parallel slide rods mounted on the frame, a carriage shiftably mounted on the rods, means for shifting the carriage to and fro along the slide rods in predetermined timed relation to the movement of the flight rods, a rotatable quill suspended from the carriage, track means mounted on the frame, means fixed upon the quill and slidably engageable with the track means for a predetermined distance for locking the quill against rotation during a predetermined portion of the movement of the carriage, a rod shiftably mounted in the quill, radial arms fixed upon the quill, grippers rockably mounted on the arms and connected for actuation to the rod for gripping selected bread loaves, and means mounted on the frame for engagement with the quill upon forward shifting movement of the carriage for turning the loaf gripping means through an angle of 180°.

12. Bread loaf handling mechanism including a conveyor table, a plurality of chain-driven flight rods mounted for movement across the table in a spaced parallel series, a frame mounted on and extending above the table, a pair of longitudinally extending spaced parallel slide rods mounted on the frame, a carriage shiftably mounted on the rods, a rotatable quill suspended from the carriage, spaced parallel rails mounted on the frame, track means on the rails for a portion of the length thereof, means fixed upon the quill and slidably engageable with the track means for locking the quill against rotation, a gear mounted on the quill, rack means mounted on one of the rails beyond the track means for quill rotative engagement with the gear, a rod shiftably mounted in the quill, arms fixed on the quill, grippers rockably mounted on the arms and connected to the rod for actuation, and driving means for initially actuating the grippers to engage a selected bread loaf and thereupon shift the carriage, associated grippers, and engaged loaf forwardly at an accelerated rate of speed, moving the quill-gear intermeshingly along the rack for rotating the loaf gripping means through an angle of 180°.

13. Bread loaf handling mechanism including a conveyor table, a plurality of chain-driven flight rods mounted for movement across the table in a spaced parallel series, a frame mounted on and extending above the table, a pair of longitudinally extending spaced parallel slide rods mounted on the frame, a carriage shiftably mounted on the rods, a rotatable quill suspended from the carriage, spaced parallel rails mounted on the frame, track means on the rails for a portion of the length thereof, means fixed upon the quill and slidably engageable with the track means for locking the quill against rotation, a gear rotatably mounted on the quill, means for connecting the gear to the quill for unidirectional movement with respect thereto, rack means mounted on one of the rails beyond the track means for quill rotative engagement with the gear, a rod shiftably mounted in the quill, arms fixed on the quill, grippers rockably mounted on the arms and connected to the rod for actuation, and driving means for initially actuating the grippers to engage a selected bread loaf and thereupon shift the carriage, associated grippers, and engaged loaf forwardly at an accelerated rate of speed, moving the quill-gear intermeshingly along the rack for rotating the loaf gripping means through an angle of 180°.

14. Bread loaf handling mechanism comprising a conveyor having a plurality of spaced flight rods, loaf-turning mechanism including a pair of swingable grippers adapted to engage the ends of the bread loaves, means for shifting the grippers in the same direction as, and at a more rapid rate of speed than, the flight rods for shifting each gripped loaf forwardly in advance of the flight rod by which it is being progressed, and means for subsequently rotating the grippers and thereby turning the gripped loaf end for end.

15. Bread loaf handling mechanism including a table, a plurality of chain-driven flight rods mounted for movement over the table, a frame mounted on and extending across the table in upwardly spaced relation thereto, a pair of spaced parallel slide rods mounted on the frame, a carriage shiftably mounted on the rods, means for shifting the carriage to and fro along the slide rods in predetermined timed relation to the movement of the flight rods, and means mounted in the carriage for gripping selected bread loaves conveyed by the flight rods and turning the same end for end.

16. In combination with a bread loaf transfer conveyor, loaf-turning mechanism comprising a frame, a carriage shiftably mounted in the frame, a quill rotatably mounted in the carriage, a gear rotatably mounted on the quill and connected to the quill for unidirectional driving movement by means of a pawl, loaf-gripping means mounted on the quill, and a rack mounted on the frame for engagement with the gear during a portion of the carriage movement for rotating the quill and associated loaf-gripping means.

17. In combination with a bread loaf transfer conveyor, loaf-turning mechanism comprising a frame, a carriage shiftably mounted in the frame, a quill rotatably mounted in the carriage, a pair of oppositely extending arms mounted in the quill, each provided with a shiftably adjustable sleeve, a loaf gripper swingably mounted on each of the sleeves, an actuating rod shiftably mounted in and extending through the quill, length-adjustable links pivotally connected at one end to the rod and at their other ends, respectively, to the loaf grippers, and means for shifting the rod and thereby moving the loaf grippers into and out of loaf-gripping position.

18. In combination with a bread loaf transfer conveyor, loaf-turning mechanism comprising a frame, a carriage shiftably mounted in the frame, a quill rotatably mounted in the carriage, a pair of oppositely extending arms mounted in the quill, each provided with a shiftably adjustable sleeve, a loaf gripper swingably mounted on each of the sleeves, an actuating rod shiftably mounted in and extending through the quill, length-adjustable links pivotally connected at one end to the rod and at their other ends, respectively, to the loaf grippers, and means adapted initially to shift the rod in a direction for swinging the grippers into loaf-engaging position and thereafter to shift the carriage along the frame.

WALTER A. THUM.